United States Patent
Mihara et al.

(10) Patent No.: US 8,397,486 B2
(45) Date of Patent: Mar. 19, 2013

(54) TWO-PULSE ROCKET MOTOR

(75) Inventors: Chiyako Mihara, Aichi (JP); Katsunori Ieki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 617 days.

(21) Appl. No.: 12/599,874

(22) PCT Filed: May 9, 2008

(86) PCT No.: PCT/JP2008/058648
§ 371 (c)(1),
(2), (4) Date: Nov. 12, 2009

(87) PCT Pub. No.: WO2008/143033
PCT Pub. Date: Nov. 27, 2008

(65) Prior Publication Data
US 2010/0218481 A1    Sep. 2, 2010

(30) Foreign Application Priority Data

May 14, 2007  (JP) .................................. 2007-127801

(51) Int. Cl.
*F02K 9/12*  (2006.01)
(52) U.S. Cl. .............................. 60/253; 60/250; 102/287
(58) Field of Classification Search .................... 60/219, 60/250, 252, 253–256, 234; 102/286, 287, 102/290, 291
See application file for complete search history.

(56) References Cited

U.S. PATENT DOCUMENTS

| | | | | |
|---|---|---|---|---|
| 3,243,956 A | * | 4/1966 | Hamm et al. ................... | 60/255 |
| 3,266,240 A | * | 8/1966 | Kurylko et al. ................. | 60/256 |
| 3,293,855 A | * | 12/1966 | Cuttill et al. ................... | 60/229 |
| 3,354,647 A | * | 11/1967 | Aycock ........................... | 60/220 |
| 3,527,168 A | * | 9/1970 | Friedlander et al. ......... | 102/287 |

(Continued)

FOREIGN PATENT DOCUMENTS

| JP | 47-9803 B4 | 3/1972 |
|---|---|---|
| JP | 59-128955 A | 7/1984 |

(Continued)

OTHER PUBLICATIONS

Japanese Office Action dated Dec. 21, 2010, issued in corresponding Japanese Patent Application No. 2007-127801.

(Continued)

*Primary Examiner* — Ted Kim
*Assistant Examiner* — Andrew Nguyen
(74) *Attorney, Agent, or Firm* — Westerman, Hattori, Daniels & Adrian, LLP

(57) ABSTRACT

In the two-pulse rocket motor in accordance with the present invention, the second propellant is set outside of the first propellant in a motor case, and the inner surface of the first propellant is exposed throughout the almost entire length in the axial direction of the motor case. Therefore, the initial burning area can be secured without deteriorating the performance. Also, by providing a weak part by bonding the barrier membranes or shaping slits on the barrier membrane, the breaking portion of barrier membrane and the behavior of barrier membrane after breakage can be controlled. Further, by setting an igniter charge having higher ignitability and a higher burning rate than the second propellant between the inner surface of the second propellant and the inner barrier membrane, the detachment of barrier membrane and the ignition of the second propellant can be assisted.

4 Claims, 7 Drawing Sheets

U.S. PATENT DOCUMENTS

| | | | |
|---|---|---|---|
| 4,085,584 A * | 4/1978 | Jones et al. | 60/250 |
| 4,137,286 A | 1/1979 | Bornstein | |
| 4,729,317 A * | 3/1988 | Burdette et al. | 102/287 |
| 5,600,946 A | 2/1997 | Dombrowski et al. | |
| 5,613,358 A * | 3/1997 | Humiston et al. | 60/250 |
| 5,675,966 A | 10/1997 | Dombrowski et al. | |

FOREIGN PATENT DOCUMENTS

| | | |
|---|---|---|
| JP | 4-41964 A | 2/1992 |
| JP | 5-202805 A | 8/1993 |
| JP | 8-270504 A | 10/1996 |
| JP | 2000-161140 A | 6/2000 |
| JP | 3231778 B2 | 11/2001 |
| JP | 2005-171970 A | 6/2005 |
| JP | 2006-152917 A | 6/2006 |
| JP | 2006-226201 A | 8/2006 |
| WO | 95/30084 A1 | 11/1995 |

OTHER PUBLICATIONS

International Search Report of PCT/JP2008/058648, mailing date of Aug. 12, 2008.

* cited by examiner (a)  (b)

TWO-PULSE ROCKET MOTOR

TECHNICAL FIELD

The present invention relates to solid propellant rocket motors which are capable of providing two separate and distinct propulsive impulses at expected time.

BACKGROUND ART

Conventionally, a two-phase motor of a solid propellant as shown in FIGS. 12 and 13 has been proposed. The two-phase motor includes a pressure vessel 100 having a rear opening that releases a propellant material, a first pulse explosive grain (a first propellant) 101 arranged in the rear part of the pressure vessel 100, a second pulse explosive grain (a second propellant) 102 arranged in the front part of the pressure vessel 100, a barrier isolator (barrier membrane) 103 for isolating the first pulse explosive grain 101 and the second pulse explosive grain 102 from each other, and a firing device means arranged in the front part of the pressure vessel 100 so that the first pulse explosive grain 101 and the second pulse explosive grain 102 can be fired selectively. The firing device means includes a first pulse firing device (ignition device) 108 arranged close to the first pulse explosive grain 101 and a second pulse firing device arranged close to the second pulse explosive grain 102. The second pulse firing device includes a firing device blocking body 105 in which an annular chamber 104 defining a firing device chamber is arranged and a second firing device explosive grain 106 for firing the second pulse explosive grain. The firing device blocking body 105 is provided with at least one nozzle port 107 for providing a path leading from the annular chamber 104 to the second pulse explosive grain 102 (for example, Patent Document 1).

Also, a two-stage thrust type rocket motor as shown in FIGS. 14 and 15 has been proposed. In this rocket motor, an injection nozzle 113 is disposed at the rear, a first combustion chamber 110 and a second combustion chamber 111 are disposed in the named order from the injection nozzle 113 directly or via a joint 112 in a state of being connected in series. In the first combustion chamber 110, a first propellant 114 having a hollow part penetrating longitudinally is provided, and in the second combustion chamber 111, a second propellant 115 having a hollow part penetrating longitudinally is provided. In the wall surface at a position at which the first propellant 114 is selectively fired, one or more through holes are provided, and in a front-side end part of a first igniting case (ignition device) 119, a first blocking body 121 to which a mechanism for firing a first igniting powder 117 is attached is provided. Also, the first igniting case 119 charged with the first igniting powder therein is arranged on the longitudinal axis line in the first combustion chamber. In the wall surface at a position at which the hollow part wall surface of the second propellant 115 is fired directly, one or more through holes are provided, and in the front-side end part of a second igniting case 120, a second blocking body 122 to which a mechanism for firing the second igniting powder 118 is attached is provided. The second igniting case (ignition device) 120 charged with the second igniting powder 118 therein is disposed in the hollow part of the second propellant 115, and the outer peripheral end part thereof is fixed by the entire of circumference of a rocket motor shell part. A barrier membrane 116 to which the inner peripheral end part of the second igniting case 120 is fixed is provided between the first igniting case 119 and the second igniting case 120 so as to isolate the first propellant 114 and the second propellant 115 from each other (for example, Patent Document 2).

[Patent Document 1] Japanese Patent No. 3231778
[Patent Document 2] Japanese Unexamined Patent Application Publication No. 2005-171970

DISCLOSURE OF INVENTION

Problem to be Solved by the Invention

Generally, in the operation of a missile equipped with a two-pulse rocket motor (a solid propellant rocket motor which is capable of providing two separate and distinct propulsive impulses at expected time), the missile is accelerated by the first pulse (the propulsive impulse generated by first propellant combustion) and flies toward its target, and when it approaches the target, it is accelerated again by the second pulse (the propulsive impulse generated by second propellant combustion) to enhance maneuverability at the terminal guidance.

Therefore, in the case of aiming at a remote target, it is necessary that first propellant mass consumed in the first pulse be increased to set burn time longer and/or thrust higher.

However, as for the rocket motor shown in FIGS. 12 and 14, the first propellant cannot have enough length because the first propellant and the second propellant are set in the axial direction of the rocket motor, and the rocket motor length is limited for equipment or storage.

If the propellant cannot have enough length, the initial burning area may reduce and the necessary initial thrust cannot be achieved in the case that propellant grain design is an internal burning type as shown in FIGS. 12 and 14.

For a means of improving the initial thrust, it is effective to set the plural slits on the inner surface of the propellant to increase the initial burning area. In that case, however, since propellant mass in the slit portion is removed, the total impulse will reduce, which may deteriorate the performance.

Also, if the first propellant is lengthened, the second propellant must be shortened because the rocket motor length is restricted. In that case, since the second propellant cannot have enough burning area and its combustion gas flow is generated insufficiently, the necessary thrust cannot be achieved at second propellant combustion with the nozzle which has the same throat diameter (the minimum diameter of exhaust hole) at first propellant combustion.

Therefore, it is necessary an additional device that can change the nozzle throat diameter appropriately at each time of first and second propellant combustion, which increases structural weight.

Also, since propellant grain design is such that the two propellants are set in the axial direction as shown in FIGS. 12 and 14, the thermal barrier membrane is exposed partly to high-temperature combustion gas from the beginning of first propellant combustion. Therefore, it is necessary to make the thermal barrier membrane thicker to protect the second propellant inside it from heat until the due time of second propellant combustion, which reduces propellant mass.

Further, the same can be said of ignition devices, so it is necessary to protect them from heat until the finish of second propellant combustion (they coming off, the nozzle may be closed), which increases structural weight.

Also, as for the thermal barrier membrane and its holding structure shown in FIGS. 12 and 14, it is not clear either behavior (breaking properties) or condition of the remains of the thermal barrier membrane when the second igniter works. If the barrier membrane is broken in an unexpected portion, the second propellant cannot have enough burning area because the barrier membrane does not detach from the burning surface and cover it.

Further, if the barrier membrane is broken in the forward portion, most of it will turn over and detach from the second propellant toward the nozzle. In that case, combustion or combustion gas flows of the second propellant can be hindered, and at worst, the nozzle may be closed by the broken barrier membrane. In particular, the above-mentioned troubles occur remarkably for long or small-diameter two-pulse rocket motors.

It is an object of this invention to provide a two-pulse rocket motor that can achieve the expected propulsive impulse and initial thrust of the first propellant and can reduce structural weight of heat protection for the thermal barrier membrane and the second igniter by the idea for propellant grain design and the placement of the second igniter.

Also, another object of the present invention is to provide a two-pulse rocket motor in which combustion or combustion gas flows of the second propellant are not hindered by providing the barrier membrane and its holding structure considering good behavior and condition of the remains of the thermal barrier membrane and further providing a device considering the exposure of the burning surface of the second propellant and its ignitability when the second igniter works.

Means for Solving Problem

The present invention solves the above-mentioned problems by the following means.

A two-pulse rocket motor of a first means has a motor case containing a second propellant, a second igniter set on the end surface of the second propellant, a barrier membrane that covers the initial burning surface of the second propellant entirely and the second igniter, and a first propellant loaded so as to cover the barrier membrane entirely, and is characterized by the first propellant and the second propellant each have an internal burning type or an internal and end burning type of propellant grain design.

A two-pulse rocket motor of a second means is, in the two-pulse rocket motor of the first means, characterized by the barrier membrane composed of an inner barrier membrane covering the inner surface of the second propellant and an aft barrier membrane covering the aft end surface of the second propellant, and the meeting edges of the aft barrier membrane and the inner barrier membrane are bonded throughout the entire periphery.

A two-pulse rocket motor of a third means is, in the two-pulse rocket motor of the first means, characterized by the barrier membrane having slits on it.

A two-pulse rocket motor of a fourth means is, in the two-pulse rocket motor of any one of the first to third means, characterized by the second igniter set on the aft end surface of the second propellant.

A two-pulse rocket motor of a fifth means is, in the two-pulse rocket motor of any one of the first to fourth means, characterized by an igniter charge having higher ignitability and a higher burning rate than the second propellant set on the inner surface of the second propellant.

A two-pulse rocket motor of a sixth means is, in the two-pulse rocket motor of the fifth means, characterized by the igniter charge set in plural slits, which are shaped on the inner surface of the second propellant in the axial direction around the longitudinal axis.

Effect of the Invention

The inventions described in the claims employ the above means and achieve the effects described below.

According to the two-pulse rocket motor of the first means, the second propellant is set outside of the first propellant, and the inner surface of the first propellant is exposed throughout the almost entire length in the axial direction of the motor case, so that the initial burning area of the first pulse can be increased. Therefore, a large slit need not be provided in the inner surface of the first propellant, and a decrease in total thrust can be avoided.

Also, the first propellant is set so as to cover the entire of barrier membrane, and the barrier membrane is protected from heat in the first half of first propellant combustion. Therefore, the plate thickness of barrier membrane can be decreased.

Also, since the second propellant is set outside of the first propellant, the burning area of the second propellant does not become extremely smaller than the burning area of the first propellant, and a varying mechanism for the throat diameter of nozzle need not be provided, so that an increase in weight can be restrained.

Also, the second propellant is protected from heat until the operation of the second propellant, and after the operation, there remains no component in the motor case. Therefore, the weight of heat-resisting material can be reduced.

According to the two-pulse rocket motor of the second or third means, the barrier membrane is divided into two pieces and a joint part is provided to weaken a portion to be broken or a slit is formed in the barrier membrane to break the barrier membrane. Therefore, the barrier membrane is surely broken at an expected position (weak part) by the pressure of gas generated by the operation of the second igniter or second propellant combustion.

Thereafter, the inner barrier membrane that occupies most of the barrier membrane deforms toward the center when being separated from the second propellant, and the holding part of barrier membrane after deformation lies in the front part of motor case where the flow due to combustion gas of the second propellant is relatively gentle, so that the survival properties are excellent.

Also, since the aft barrier membrane itself after breakage is small, when being separated, the aft barrier membrane deforms naturally in the nozzle-side direction along the flow of combustion gas of the second propellant, so that the survival properties are excellent.

Thus, by breaking the barrier membrane at the expected position, the deformation shape of barrier membrane after detachment is made in a state in which condition of the remains is excellent. Thereby, combustion gas of the second propellant is exhausted through the exhaust hole of nozzle in such a manner that the flow is not hindered by the barrier membrane.

According to the two-pulse rocket motor of the fourth means, since the second igniter is set on the aft end surface of the second propellant, the weak part (joint part or slit) of barrier membrane or a portion to be broken of the barrier membrane can be broken more surely.

According to the two-pulse rocket motor of the fifth means, since the igniter charge having higher ignitability and a higher burning rate than the second propellant is provided between the inner surface of the second propellant and the barrier membrane, the igniter charge is ignited earlier than the second propellant by the operation of the second igniter. Thereby, the separation of the inner barrier membrane or the inside portion of the barrier membrane (exposure of burning surface of the second propellant) and the ignition of the second propellant are assisted, so that the second propellant can be burned surely.

Also, the invention of this means also has an effect that the pressure at the second pulse is raised quickly by combustion gas of igniter charge.

According to the two-pulse rocket motor of the sixth means, since the igniter charge is set so as to match the shape of the inner surface of the second propellant, the degree of freedom can be given to the propellant shape of the second propellant.

Figure 1:
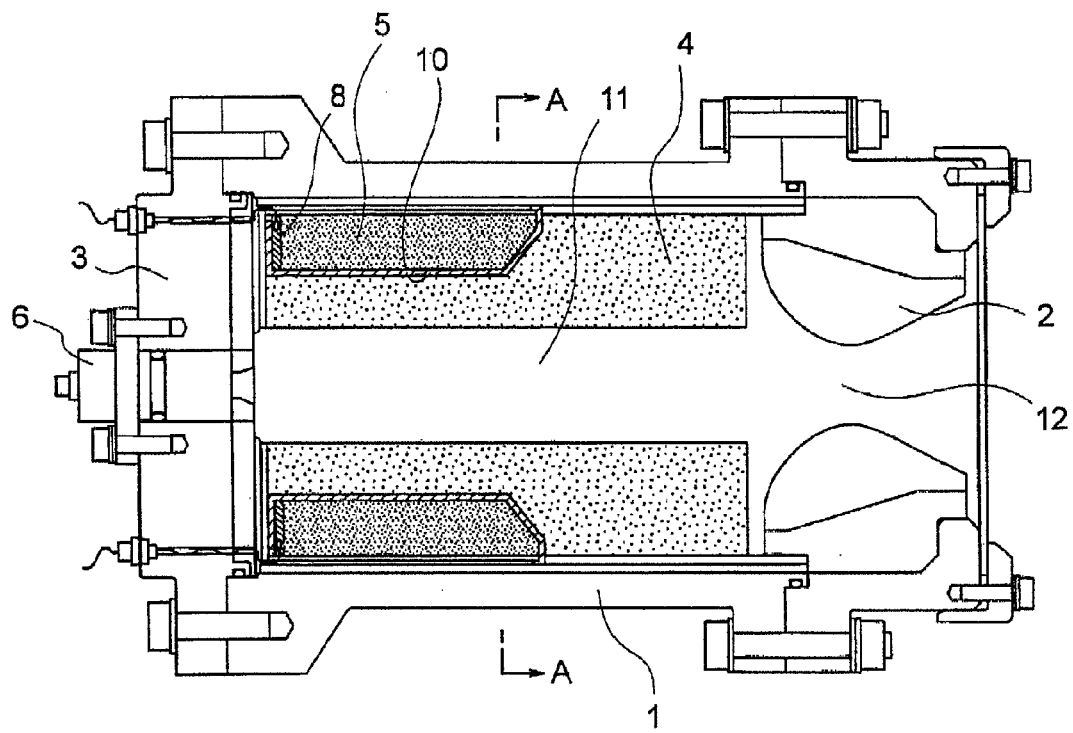
FIG. 1 is a longitudinal sectional view of a two-pulse rocket motor in accordance with a first embodiment of the present invention.

EXPLANATIONS OF LETTERS OR NUMERALS 1 motor case
2 nozzle
3 end plate
4 first propellant
5 second propellant
6 first igniter
8 second igniter
10 barrier membrane
10a aft barrier membrane
10b inner barrier membrane
11 burning region
12 exhaust hole
14 igniter charge

BEST MODE(S) FOR CARRYING OUT THE INVENTION

Tow-pulse rocket motors in accordance with embodiments of the present invention are now described with reference to the accompanying drawings.

Figure 2:
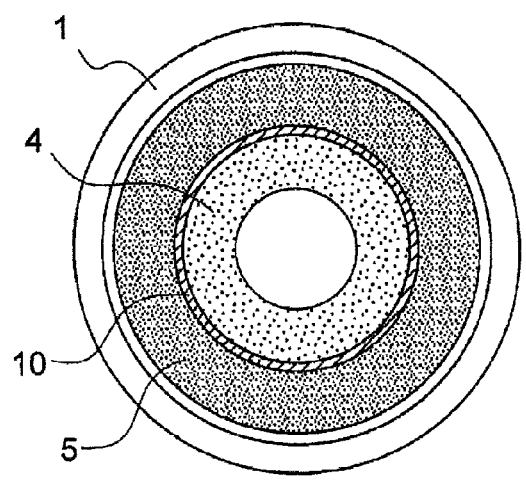
FIG. 2 is a sectional view taken along the line A-A of FIG. 1.

FIG. 1 is a longitudinal sectional view of a two-pulse rocket motor in accordance with a first embodiment of the present invention, and FIG. 2 is a sectional view taken along the line A-A of FIG. 1.

Figure 3:
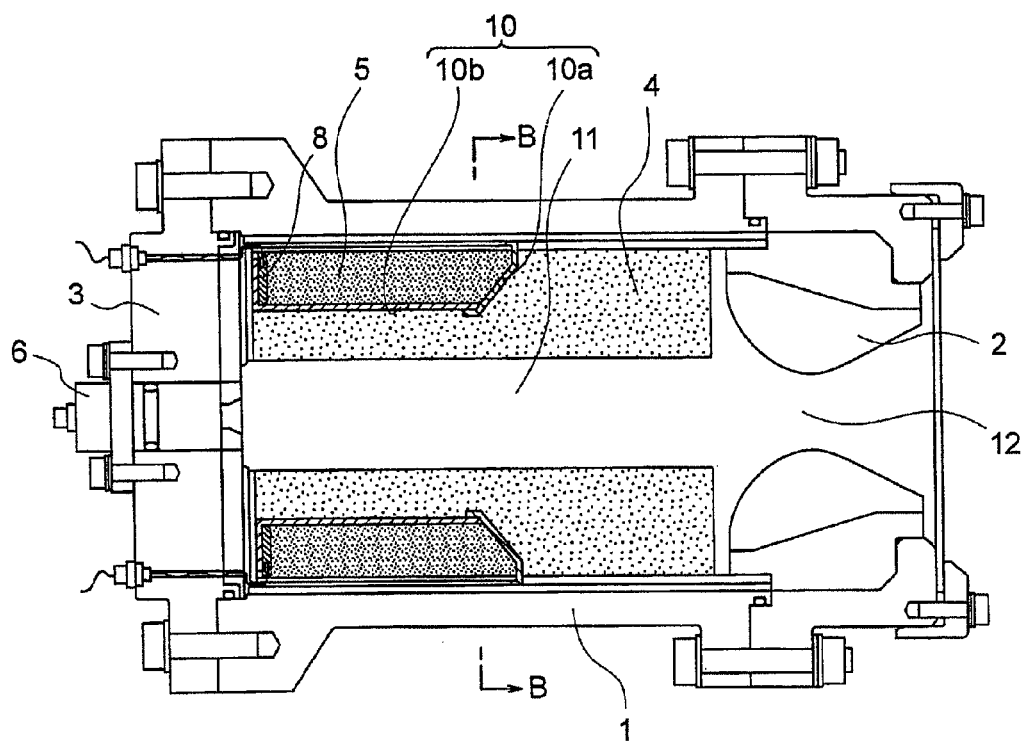
FIG. 3 is a longitudinal sectional view of a two-pulse rocket motor in accordance with a second embodiment of the present invention.
Figure 4:
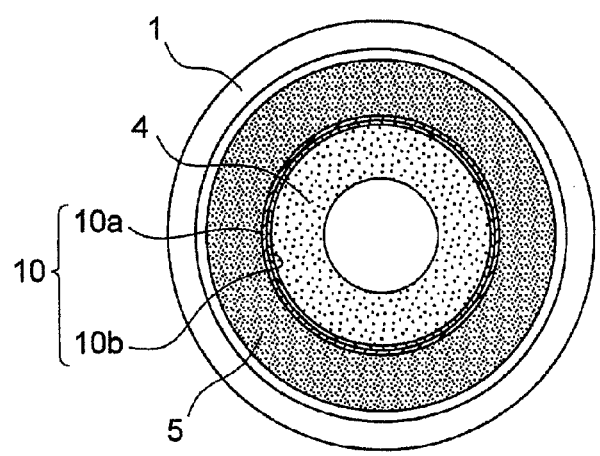
FIG. 4 is a sectional view taken along the line B-B of FIG. 3.

FIG. 3 is a longitudinal sectional view of a two-pulse rocket motor in accordance with a second embodiment of the present invention, and FIG. 4 is a sectional view taken along the line B-B of FIG. 3.

Figure 5:
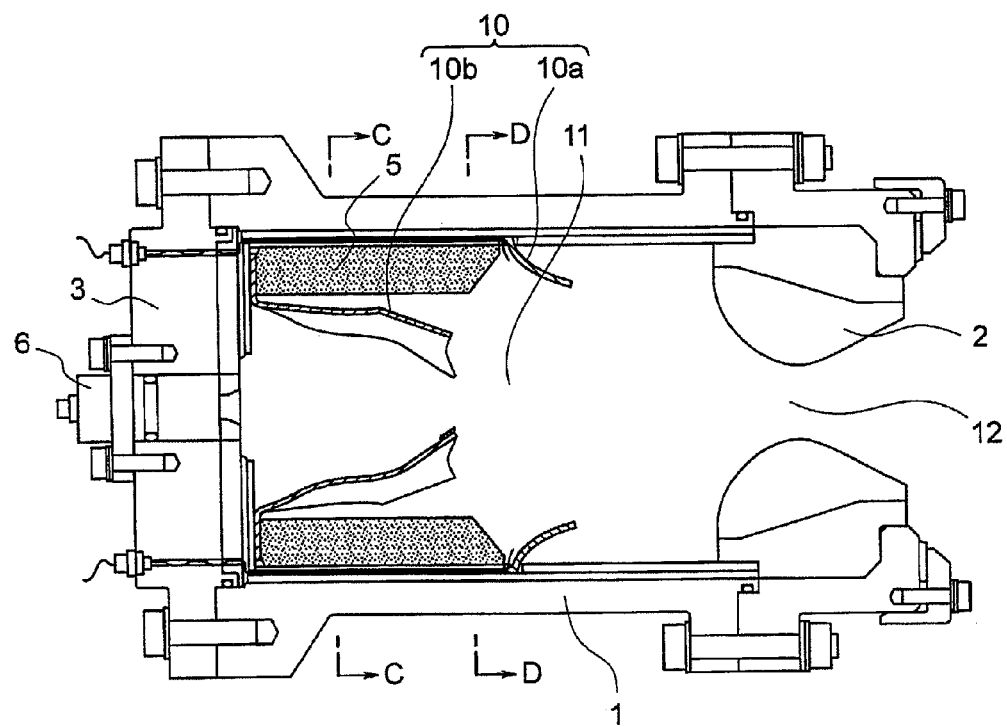
FIG. 5 is a longitudinal sectional view showing a state in which a barrier membrane is deformed at the burn time of second propellant combustion in a two-pulse rocket motor in accordance with a second embodiment of the present invention.

FIG. 5 is a longitudinal sectional view showing a state in which a barrier membrane is deformed at the burn time of second propellant combustion in the two-pulse rocket motor in accordance with the second embodiment of the present invention. FIG. 6(a) is a sectional view taken along the line C-C of FIG. 5, and FIG. 6(b) is a sectional view taken along the line D-D of FIG. 5.

Figure 7:
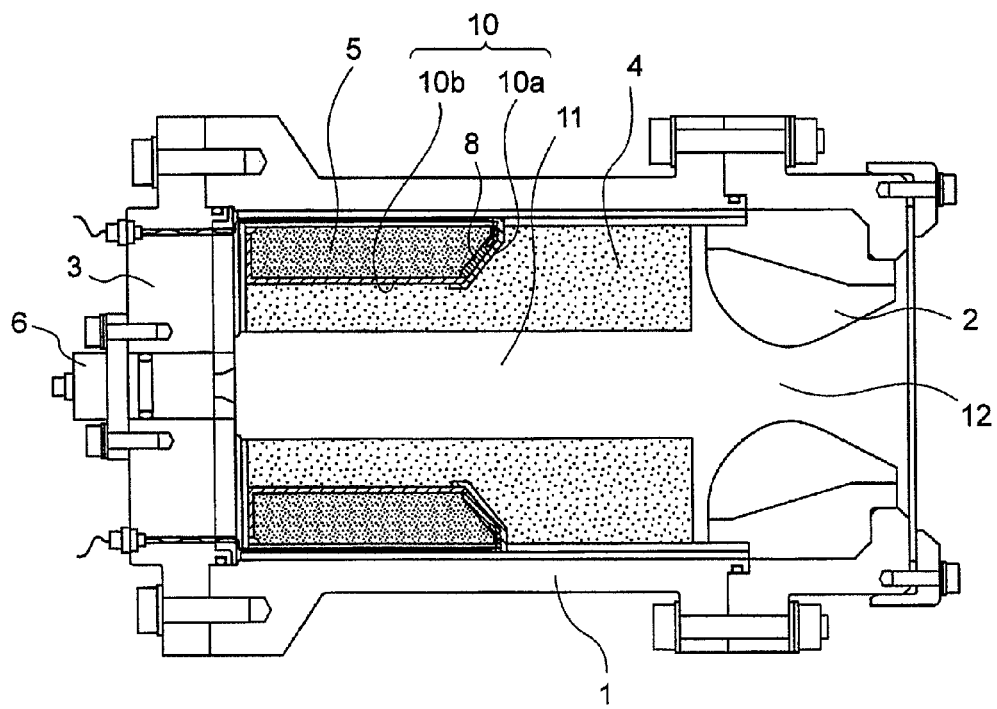
FIG. 7 is a longitudinal sectional view of a two-pulse rocket motor in accordance with a third embodiment of the present invention.

FIG. 7 is a longitudinal sectional view of a two-pulse rocket motor in accordance with a third embodiment of the present invention.

Figure 8:
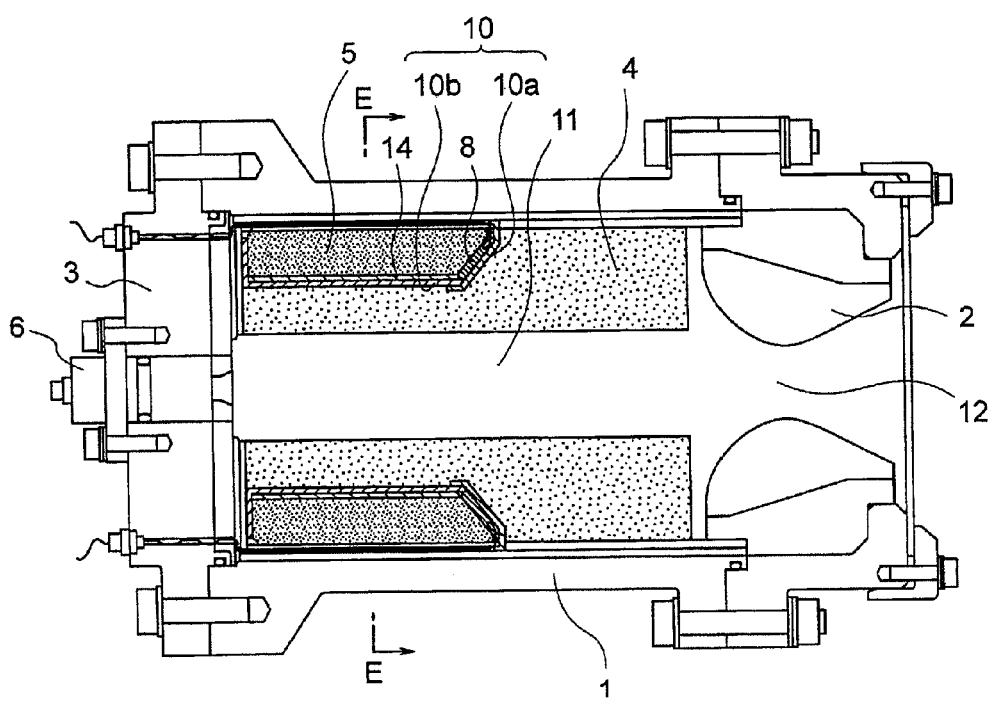
FIG. 8 is a longitudinal sectional view of a two-pulse rocket motor in accordance with a fourth embodiment of the present invention.
Figure 9:
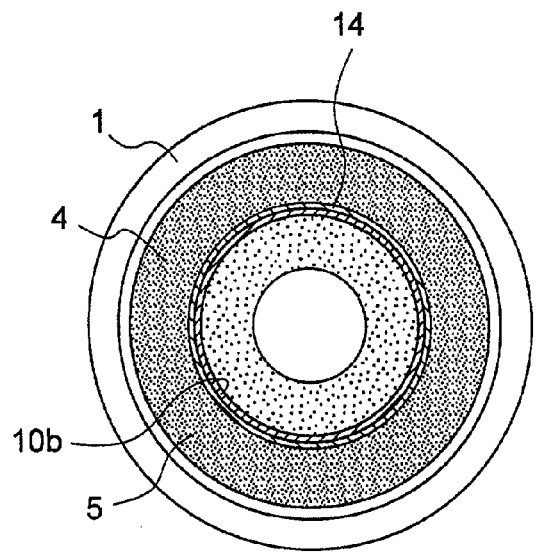
FIG. 9 is a sectional view taken along the line E-E of FIG. 8.

FIG. 8 is a longitudinal sectional view of a two-pulse rocket motor in accordance with a fourth embodiment of the present invention, and FIG. 9 is a sectional view taken along the line E-E of FIG. 8.

Figure 10:
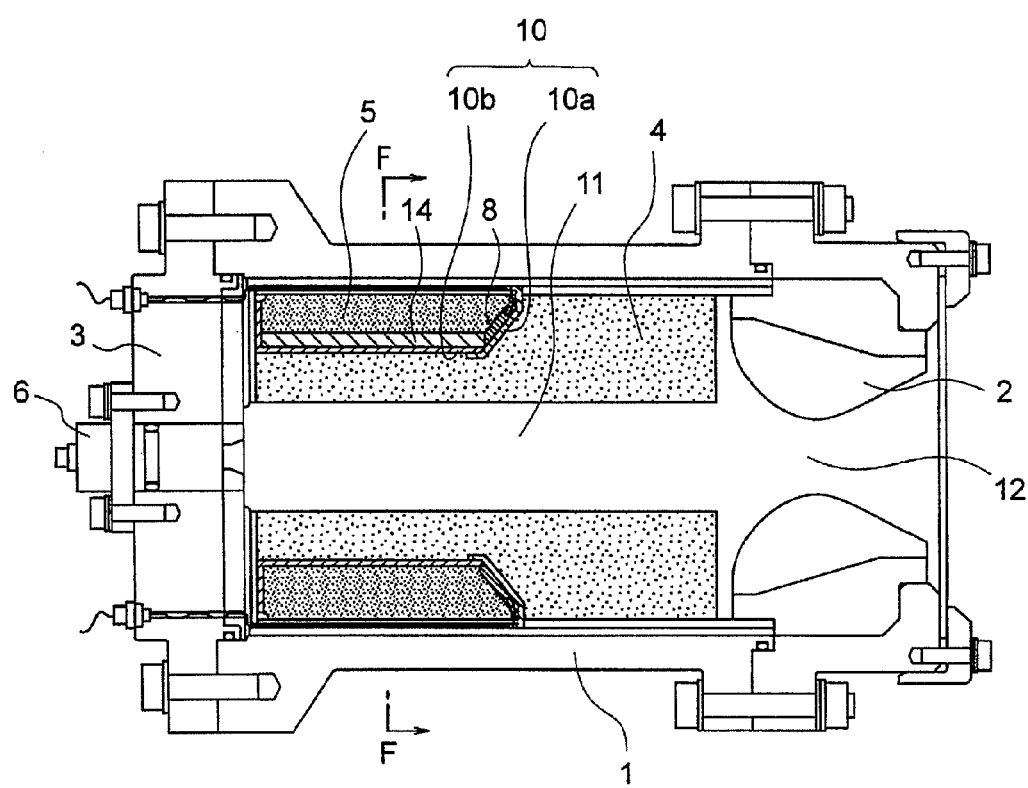
FIG. 10 is a longitudinal sectional view of a two-pulse rocket motor in accordance with a fifth embodiment of the present invention.
Figure 11:
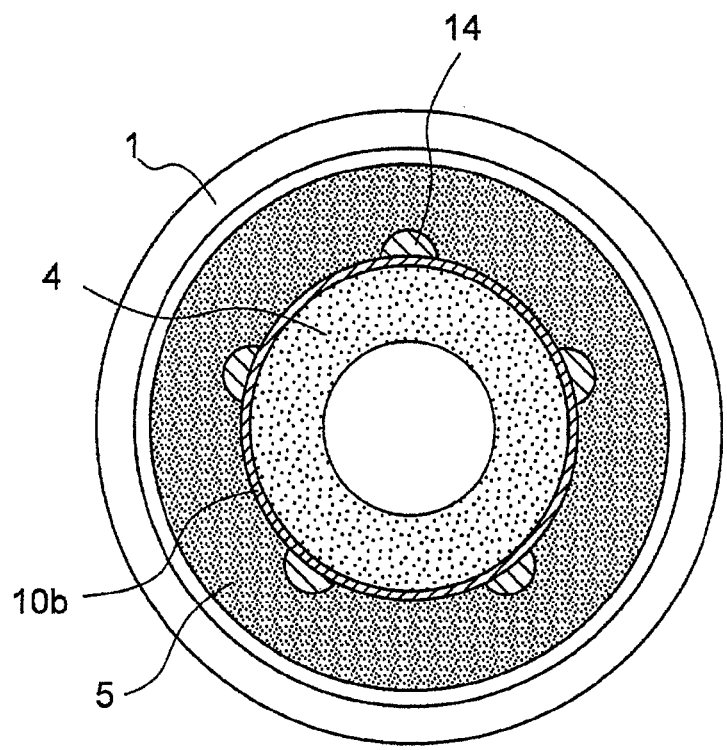
FIG. 11 is a sectional view taken along the line F-F of FIG. 10.
Figure 12:
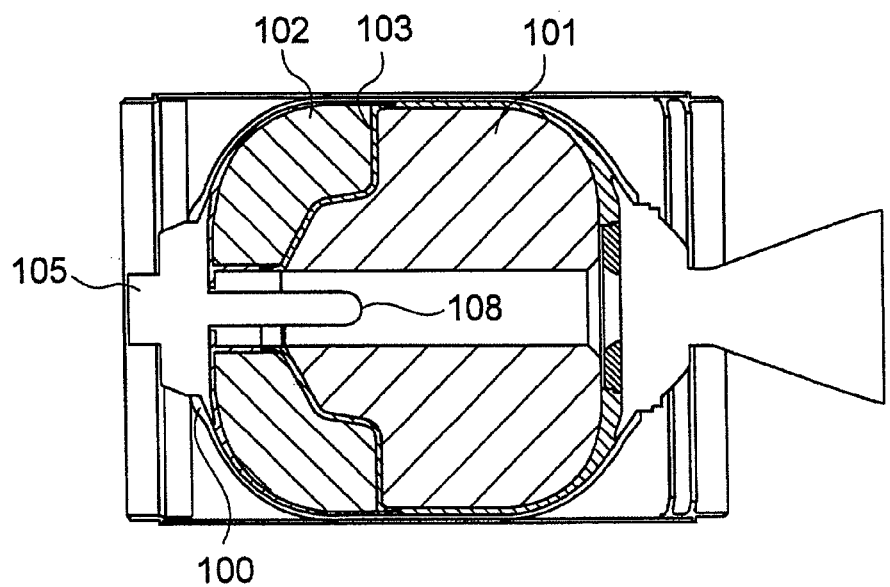
FIG. 12 is a configuration view of a conventional two-stage thrust type rocket motor.

FIG. 10 is a longitudinal sectional view of a two-pulse rocket motor in accordance with a fifth embodiment of the present invention, and FIG. 11 is a sectional view taken along the line F-F of FIG. 10.

First Embodiment of the Present Invention

First, a two-pulse rocket motor in accordance with a first embodiment of the present invention is explained with reference to FIGS. 1 and 2.

The two-pulse rocket motor in accordance with the first embodiment burns a first propellant 4 and subsequently burns a second propellant 5 after arbitrary time has elapsed to produce two-stage thrust.

Therefore, during the time before combustion is started, the second propellant 5 must withstand high-temperature combustion gas and a high pressure produced by combustion of the first propellant 4.

Also, it is desirable that the first propellant 4 and the second propellant 5 can accommodate various thrust patterns by using a common nozzle 2 by the contrivance of the arrangement and propellant shape thereof.

As shown in FIGS. 1 and 2, the nozzle 2 having an exhaust hole 12 for exhausting combustion gas in the center therein is attached to the rear of a cylindrical motor case 1.

To the front of the motor case 1, an end plate 3 is attached, and to the front of the end plate 3, a first igniter 6 for burning the first propellant 4 is attached.

On the inside of the motor case 1, the first propellant 4 and the second propellant 5 each having a hollow and cylindrical shape (a propellant shape of an internal burning type or an internal and end burning type) are charged, and the second propellant 5 is set outside and the forward part of the first propellant 4.

The shape of each of the first propellant 4 and the second propellant 5 can be a hollow cylindrical shape, a hollow tubular shape having polygonal inner surface and/or outer surface, a hollow conical shape, or the like shape.

The first propellant 4 and the second propellant 5 are isolated from each other by a barrier membrane 10.

As being known publicly, as the barrier membrane 10, a highly heat-resistant rubber such as silicone rubber or EPDM rubber, containing EPDM rubber, silicone rubber, and inorganic fiber such as Kevlar fiber as a composition thereof can be used.

At the front end of the second propellant 5, a second igniter 8 for burning the second propellant 5 is provided.

Figure 13:
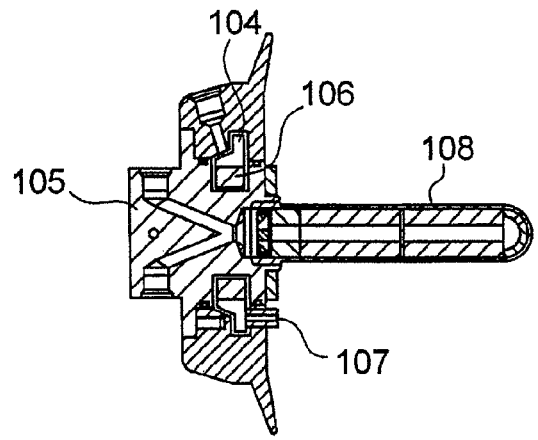
FIG. 13 is a detailed view of an ignition device means of the two-stage thrust type rocket motor shown in FIG. 12.
Figure 14:
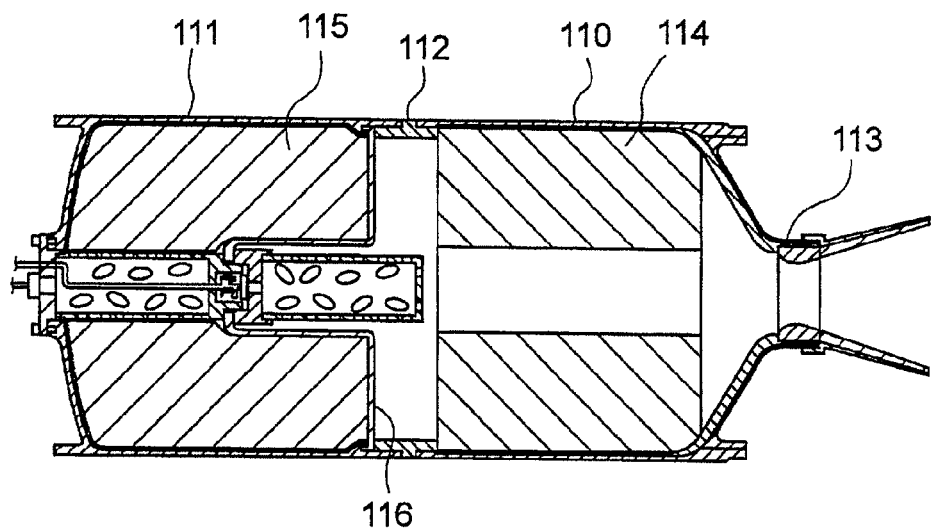
FIG. 14 is a configuration view of another conventional two-stage thrust type rocket motor.
Figure 15:
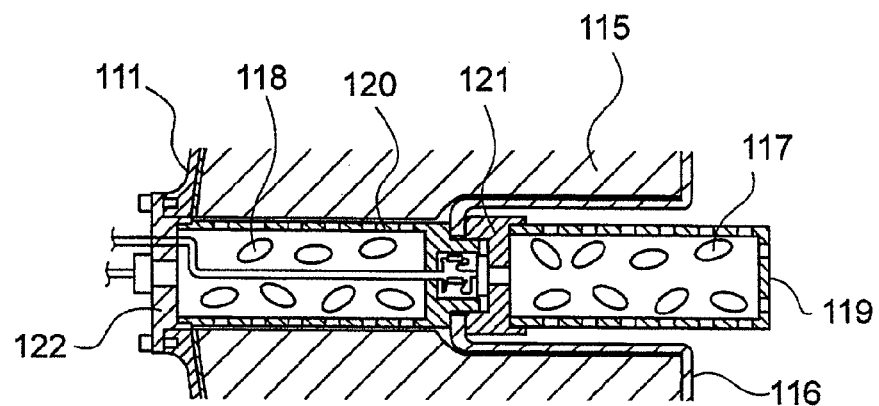
FIG. 15 is a detailed view of a first igniting case and a second igniting case of the two-stage thrust type rocket motor shown in FIG. 14.

The second igniter 8 is not limited to one having the above-described construction. For example, the second igniter 8 may be configured by a tubular chamber 104, a nozzle port 107, and the like shown in FIG. 13 (cited document 1).

The shapes of the first propellant 4, the barrier membrane 10, and the second propellant 5 are not limited to those shown in FIGS. 1 and 2. The propellant shape, the propellant length, and the like can be set appropriately according to various thrust patterns.

The two-pulse rocket motor in accordance with the first embodiment of the present invention is configured as described above. The first igniter 6 is operated by a signal sent from the outside, by which combustion of the first propellant 4 is started. At this point of time, the barrier membrane 10 is not exposed to high-temperature combustion gas.

When the first propellant 4 burns to the position of the barrier membrane 10, the barrier membrane 10 is exposed to high-temperature combustion gas.

After combustion of the first propellant 4 has finished and arbitrary time has elapsed, the second igniter 8 is operated by a signal sent from the outside, by which combustion of the second propellant 5 is started.

According to the two-pulse rocket motor in accordance with the first embodiment of the present invention, the inner surface of the first propellant 4 is exposed to a burning region 11 throughout the almost entire length in the axial direction of the motor case 1. Therefore, the initial burning area can be secured, so that a large slit need not be provided in the inner surface of the first propellant 4.

Also, since the second propellant 5 is set outside of the first propellant 4, the burning area of the second propellant 5 does not become extremely smaller than the burning area of the first propellant 4, so that the nozzle 2 for the first propellant 4 can be used commonly.

Also, since the second propellant 5 is set outside of the first propellant 4 and the barrier membrane 10 is provided therebetween, the time over which the barrier membrane 10 is exposed to high-temperature combustion gas can be shortened as much as possible, so that the barrier membrane 10 can be protected from heat.

Further, the second igniter 8 is protected from heat by the barrier membrane 10 like the second propellant 5, and is burned down by the operation, so that the protection from heat is not needed.

The initial burning surface of the second propellant 5 in the present invention means a surface burned from the initial stage when the second propellant 5 begins to burn, that is, a surface exposed to the burning region 11 first when the second propellant 5 is burned. In the example shown in FIG. 1, the cylindrical inner surface on the inside of the second propellant 5 and the ring-shaped rear surface at the rear thereof are the initial burning surfaces.

Second Embodiment of the Present Invention

Next, a two-pulse rocket motor in accordance with a second embodiment of the present invention is explained with reference to FIGS. 3 to 6.

In the two-pulse rocket motor in accordance with the second embodiment of the present invention, the barrier membrane 10 is divided into two pieces, and a weak part (joint part) is provided as compared with the first embodiment of the present invention.

As shown in FIGS. 3 and 4, the barrier membrane 10 covering the second propellant 5 is formed by a circular truncated cone shaped aft barrier membrane 10a provided on the rear surface of the second propellant 5 and a cylindrical inner barrier membrane 10b provided on the inner surface of the second propellant 5.

The end part in which the aft barrier membrane 10a and the inner barrier membrane 10b meet provides the weak part formed by joining the aft barrier membrane 10a and the inner barrier membrane 10b to each other throughout the entire periphery by using a fire-resistant adhesive. The joint part is not broken during combustion of the first propellant 4, and is broken surely by the pressure of gas generated by the operation of the second igniter 8 or combustion of the second propellant 5.

Figure 6:
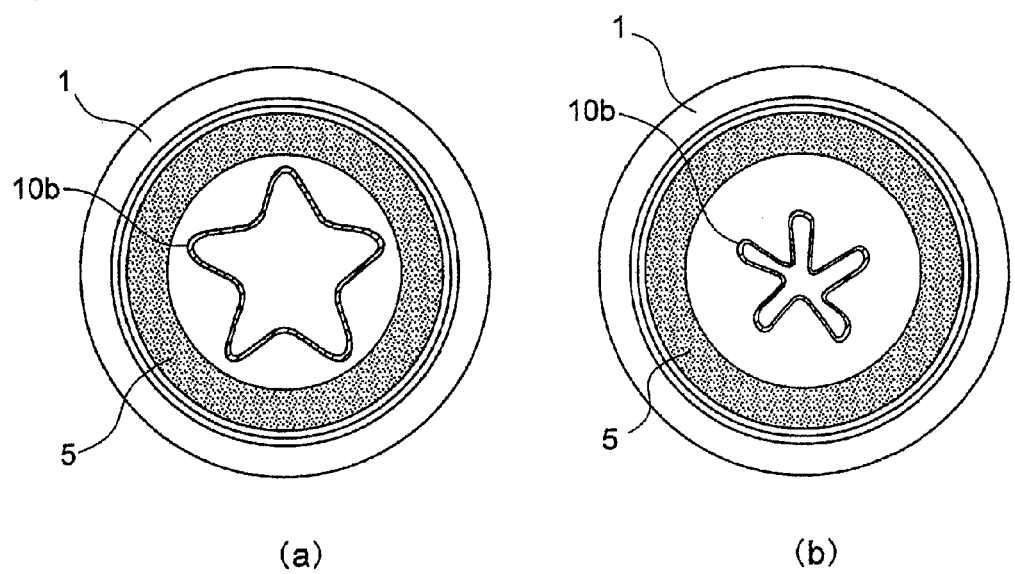
FIG. 6(a) is a sectional view taken along the line C-C of FIG. 5.
FIG. 6(b) is a sectional view taken along the line D-D of FIG. 5.

Thereafter, as shown in FIGS. 5 and 6, the inner barrier membrane 10b that occupies most of the barrier membrane 10 deforms toward the center, and is held in the front part of motor case where the flow due to combustion gas of the second propellant 5 is relatively gentle. Also, the broken part of the aft barrier membrane 10a deforms so as to be turned up to the rear along the flow of combustion gas.

According to the two-pulse rocket motor in accordance with the second embodiment of the present invention, in addition to the operation and effect of the first embodiment of the present invention, the breaking properties and the survival properties of the barrier membrane 10 (the aft barrier membrane 10a, the inner barrier membrane 10b) are clear and reliable.

The configuration in which the barrier membrane 10 is manufactured integrally and a slit is formed in a portion to be broken and the like configuration can achieve the same effect as that of the configuration in which the barrier membrane 10 is divided into two pieces.

Third Embodiment of the Present Invention

Next, a two-pulse rocket motor in accordance with a third embodiment of the present invention is explained with reference to FIG. 7.

In the two-pulse rocket motor in accordance with the third embodiment of the present invention, the second igniter 8 is provided at a position close to the joint part of the barrier membrane 10 (the aft barrier membrane 10a, the inner barrier membrane 10b) on the rear end surface of the second propellant 5 as compared with the first and second embodiments of the present invention.

According to the two-pulse rocket motor in accordance with the third embodiment of the present invention, the operation and effect of the second embodiment of the present invention are improved, and the reliability of breaking of the barrier membrane 10 (the aft barrier membrane 10a, the inner barrier membrane 10b) is increased.

Fourth Embodiment of the Present Invention

Next, a two-pulse rocket motor in accordance with a fourth embodiment of the present invention is explained with reference to FIGS. 8 and 9.

In the two-pulse rocket motor in accordance with the fourth embodiment of the present invention, an igniter charge 14 for the second propellant 5 is charged between the inner surface of the second propellant 5 and the inner barrier membrane 10b as compared with the first to third embodiments of the present invention.

As shown in FIGS. 8 and 9, between the inner surface of the second propellant 5 and the inner barrier membrane 10b, the cylindrical igniter charge 14 is charged.

The igniter charge 14 used has higher ignitability and a higher burning rate than the second propellant 5.

The two-pulse rocket motor in accordance with the fourth embodiment of the present invention is configured as described above. In burning the second propellant 5, the second igniter 8 is operated by a signal sent from the outside, and the gas generated by combustion of the igniter charge 14 assists the separation of the inner barrier membrane 10b and the ignition of the second propellant 5.

According to the two-pulse rocket motor in accordance with the fourth embodiment of the present invention, in addition to the operation and effect of the third embodiment of the present invention, the igniter charge 14 increases the reliability of the exposure and ignition of burning surface of the second propellant 5.

Fifth Embodiment of the Present Invention

Next, a two-pulse rocket motor in accordance with a fifth embodiment of the present invention is explained with reference to FIGS. 10 and 11.

In the two-pulse rocket motor in accordance with the fifth embodiment of the present invention, the igniter charge 14 for the second propellant 5 is charged by being divided into several pieces in the circumferential direction as compared with the fourth embodiment of the present invention.

As shown in FIGS. 10 and 11, plural slits (grooves) are shaped on the inner surface of the second propellant 5 in the axial direction around the longitudinal axis, in which the igniter charge 14 is set.

According to the two-pulse rocket motor in accordance with the fifth embodiment of the present invention, which is configured as described above, in addition to the operation and effect of the fourth embodiment of the present invention, the degree of freedom can be given to the propellant shape of the second propellant 5 by arranging the igniter charge 14 so as to match the shape of the inner surface of the second propellant 5.

Other Embodiments

The above is an explanation of the embodiments of the present invention. However, the present invention is not limited to the above-described embodiments. It is a matter of course that various changes can be made within the scope of the present invention.

For example, in order to surely break a portion to be broken of the barrier membrane 10, two-pulse rocket motors consisting of combinations described below, including the combinations described in the above embodiments, can be embraced in the present invention.

(1) A two-pulse rocket motor in which, as shown in FIGS. 3 to 6, the second igniter 8 is set the forward part of the second propellant 5, the barrier membrane 10 is divided into the aft barrier membrane 10a and the inner barrier membrane 10b, and the meeting edges of the aft barrier membrane 10a and the inner barrier membrane 10b are bonded throughout the entire periphery (by an adhesive etc.).

(2) A two-pulse rocket motor in which the second igniter 8 is set the forward part of the second propellant 5, and the barrier membrane 10 has slits on the expected breaking portion of it.

(3) A two-pulse rocket motor in which the second igniter 8 is set on the aft end surface of the second propellant 5.

(4) A two-pulse rocket motor in which, as shown in FIG. 7, the barrier membrane 10 is divided into the aft barrier membrane 10a and the inner barrier membrane 10b, and the meeting edges of the aft barrier membrane 10a and the inner barrier membrane 10b are bonded throughout the entire periphery (by an adhesive etc.), and the second igniter 8 is set on the aft end surface of the second propellant 5.

(5) A two-pulse rocket motor in which the barrier membrane 10 has slits on the expected breaking portion of it, and the second igniter 8 is set on the aft end surface of the second propellant 5.

(6) A two-pulse rocket motor in which the second igniter 8 is set the forward part of the second propellant 5, and the igniter charge 14 having higher ignitability and a higher burning rate than the second propellant 5 is set on the inner surface of the second propellant 5.

(7) A two-pulse rocket motor in which the barrier membrane 10 is divided into the aft barrier membrane 10a and the inner barrier membrane 10b, and the meeting edges of the aft barrier membrane 10a and the inner barrier membrane 10b are bonded throughout the entire periphery (by an adhesive etc.), the second igniter 8 is set the forward part of the second propellant 5, and the igniter charge 14 having higher ignitability and a higher burning rate than the second propellant 5 is set on the inner surface of the second propellant 5.

(8) A two-pulse rocket motor in which the second igniter 8 is set on the aft end surface of the second propellant 5, and the igniter charge 14 having higher ignitability and a higher burning rate than the second propellant 5 is set on the inner surface of the second propellant 5.

(9) A two-pulse rocket motor in which, as shown in FIGS. 8 and 9, the barrier membrane 10 is divided into the aft barrier membrane 10a and the inner barrier membrane 10b, and the meeting edges of the aft barrier membrane 10a and the inner barrier membrane 10b are bonded throughout the entire periphery (by an adhesive etc.), the second igniter 8 is set on the aft end surface of the second propellant 5, and the igniter charge 14 having higher ignitability and a higher burning rate than the second propellant 5 is set on the inner surface of the second propellant 5.

(10) A two-pulse rocket motor in which the barrier membrane 10 has slits on the expected breaking portion of it, the second igniter 8 is set on the aft end surface of the second propellant 5, and the igniter charge 14 having higher ignitability and a higher burning rate than the second propellant 5 is set on the inner surface of the second propellant 5.

(11) A two-pulse rocket motor in which the second igniter 8 is set the forward part of the second propellant 5, and the igniter charge 14 is set in the plural slits shaped on the inner surface of the second propellant 5 in the axial direction around the longitudinal axis.

(12) A two-pulse rocket motor in which the barrier membrane 10 is divided into the aft barrier membrane 10a and the inner barrier membrane 10b, and the meeting edges of the aft barrier membrane 10a and the inner barrier membrane 10b are bonded throughout the entire periphery (by an adhesive etc.), the second igniter 8 is set the forward part of the second propellant 5, and the igniter charge 14 is set in the plural slits shaped on the inner surface of the second propellant 5 in the axial direction around the longitudinal axis.

(13) A two-pulse rocket motor in which the second igniter 8 is set on the aft end surface of the second propellant 5, and the igniter charge 14 is set in the plural slits shaped on the inner surface of the second propellant 5 in the axial direction around the longitudinal axis.

(14) A two-pulse rocket motor in which, as shown in FIGS. 10 and 11, the barrier membrane 10 is divided into the aft barrier membrane 10a and the inner barrier membrane 10b, and the meeting edges of the aft barrier membrane 10a and the inner barrier membrane 10b are bonded throughout the entire periphery (by an adhesive etc.), the second igniter 8 is set on the aft end surface of the second propellant 5, and the igniter charge 14 is set in the plural slits shaped on the inner surface of the second propellant 5 in the axial direction around the longitudinal axis.

(15) A two-pulse rocket motor in which the barrier membrane 10 has slits on the expected breaking portion of it, the second igniter 8 is set on the aft end surface of the second propellant 5, and the igniter charge 14 is set in the plural slits shaped on the inner surface of the second propellant 5 in the axial direction around the longitudinal axis.

The invention claimed is:

1. A two-pulse rocket motor having a motor case, comprising:
    a second propellant;
    a second igniter set on an end surface of the second propellant;
    a barrier membrane that covers an initial burning surface of the second propellant entirely and the second igniter; and
    a first propellant loaded so as to cover the barrier membrane entirely, wherein
    the first propellant and the second propellant each has an internal burning type or an internal and end burning type of propellant grain design,
    the barrier membrane is composed of an inner barrier membrane covering an inner surface of the second of the second propellant and an aft barrier membrane covering an aft end surface of the second propellant; and
    a meeting edge of the aft barrier membrane and the inner barrier membrane is bonded throughout an entire periphery by using a fire-resistant adhesive in order to form a weak part, wherein the aft barrier membrane and the inner barrier membrane separate at the weak part upon combustion of the second propellant.

2. The two-pulse rocket motor according to claim 1, wherein the second igniter is set on the aft end surface of the second propellant.

3. The two-pulse rocket motor according to claim 1, wherein an igniter charge having higher ignitability and a higher burning rate than the second propellant is set on the inner surface of the second propellant.

4. The two-pulse rocket motor according to claim 3, wherein the igniter charge is set in plural slots, which are shaped on the inner surface of the second propellant in the axial direction around the longitudinal axis.

* * * * *